Nov. 30, 1965  E. C. SLOAN  3,220,374
MARINE EQUIPMENT PROTECTIVE DEVICE
Filed April 20, 1964
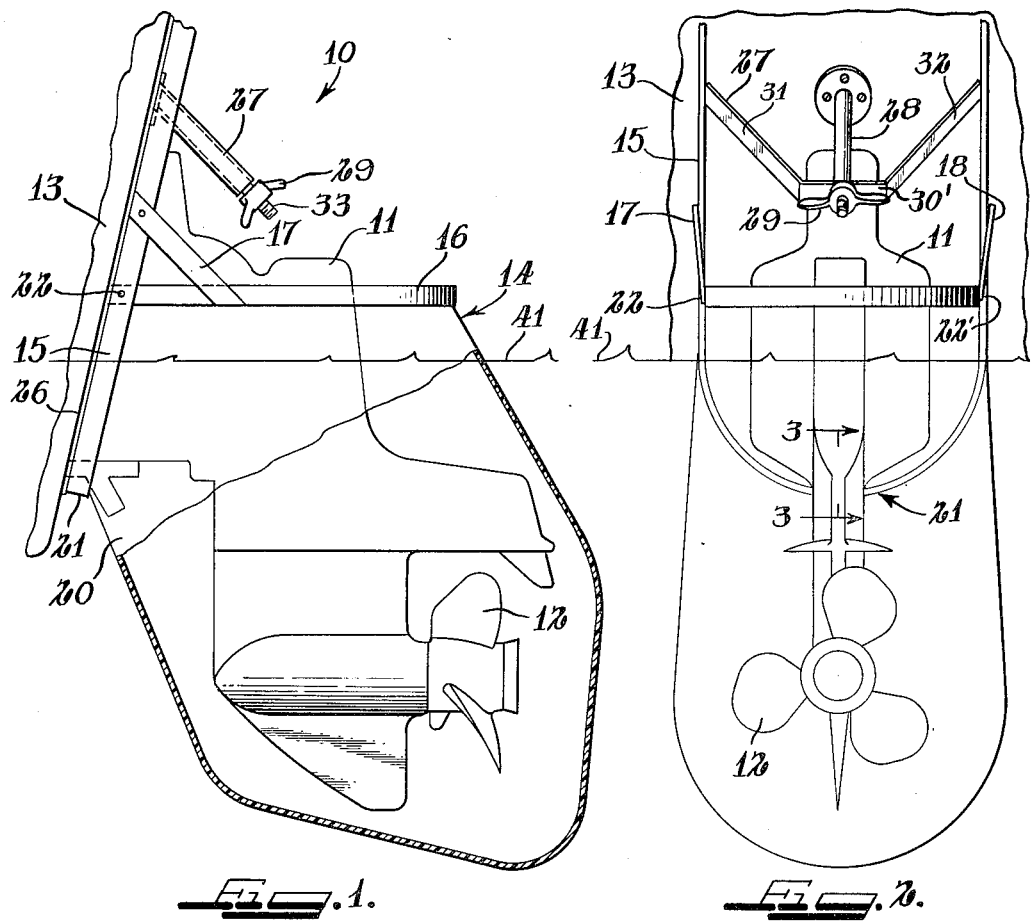
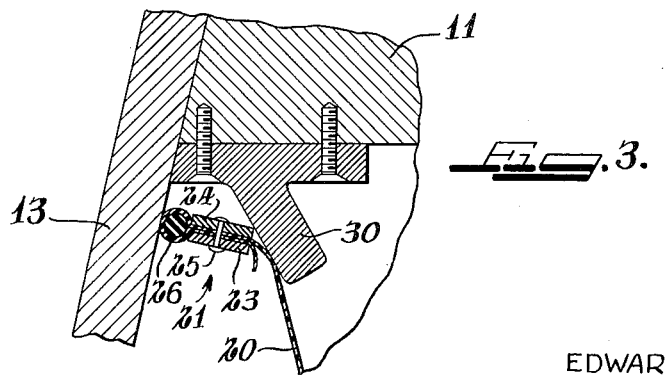
INVENTOR.
EDWARD C. SLOAN
BY
Greist, Lockwood, Greenawalt & Dewey
Attys.

3,220,374
MARINE EQUIPMENT PROTECTIVE DEVICE
Edward C. Sloan, 5858 Midnight Pass Road,
Sarasota, Fla.
Filed Apr. 20, 1964, Ser. No. 361,004
5 Claims. (Cl. 115—.5)

This invention relates to a marine equipment protective device in general, and more specifically is directed towards a unique means and method of protecting marine equipment such as outer drives on boats from the corrosive action of the water and/or marine growth when the boat is not in use.

The advantages of the present invention will become readily comprehended when consideration is given to the more prominent objects to be achieved, and the structure of the unique marine equipment protective device for fulfilling the stated objects.

It is an object of this invention to provide a novel protective device particularly adapted for use in marine equipment during periods of non-use when the marine equipment is intended to remain immersed in the water.

It is another object of this invention to provide a marine equipment protective device adapted to be fitted around marine equipment such as outer drives and the like which under normal circumstances remain immersed in the water when the water craft is at rest, the protective device being adapted to isolate the water adjacent the marine equipment from the surrounding water in order to permit the water immediately adjacent the marine equipment to be chemically treated to inhibit corrosion, electrolysis, attaching of marine growth and the like.

It is a further object of this invention to provide a marine equipment protective device particularly adapted for use on outer drives on water craft, the protective device being adapted to be attached to the transom of a water craft to isolate a portion of the water surrounding the outer drive thereby to permit effective treatment of the water in order to inhibit corrosion of the equipment.

It is a still further object of the invention to provide a marine equipment protective device of uncomplicated design which serves to protect outer drives on boats, the protective device including a framework supporting a flexible envelope which may be easily fitted over the outer drive and fluidtightly held to the boat structure to permit treatment of the water surrounding the outer drive for the inhibition of marine growth and the corrosive action of the water.

Further and fuller objects of the present invention will become readily apparent when reference is made to the accompanying drawings wherein:

FIG. 1 is an elevational view of an outer drive on a boat with the transom of the boat being shown fragmentarily and the water surrounding the outer drive being isolated by the protective device of the present invention;

FIG. 2 is a rear elevational view of the outer drive and protective device shown in FIG. 1; and FIG. 3 is an enlarged fragmentary cross sectional view taken along the lines 3—3 of FIG. 2.

Boat owners in the warmer regions of the country leave their boats in the water the entire year, and in many instances do not remove the boat from the water over even longer periods of time. In case of boats equipped with outer drives, the propeller and portions of the outer drive housing remain in the water at all times even when the boat is docked. As a general rule, the outer drive housing and propeller are formed of corrosive resistant metal such as aluminum, stainless steel, bronze and the like. One problem that has been encountered in leaving the outer drive unit in the water over prolonged periods is the tendency for marine growth to attach to the outer drive housing with the obvious deleterious effects. In some cases the corrosive action of salt water over long periods of time is sufficient to overcome the resistance of the metals to corrosion. This is particularly true where adjacent metal parts of the outer drive, when in the presence of salt water, exhibit an electrolytic or battery-like effect causing the parts to be eaten away. The present invention proposes a unique but simplified solution to this perplexing problem.

As seen in FIG. 1, reference character 10 indicates a fragmentary portion of a boat or water craft having an outer drive unit 11 mounting a propeller 12. The outer drive housing 11 is joined to the transom 13 of the boat 10 (shown fragmentarily) and as is well known is allowed to move angularly slight amounts to control the direction of the water craft when underway.

The marine equipment protective device of the instant invention is indicated generally at 14 being adapted to envelope the outer drive housing 11 and propeller 12 in order to isolate a portion of the water immediately surrounding the same. Once this is accomplished, the water may be treated, diluted or replaced with fresh water to guard against marine growth, corrosive action and the like. The protective device 14 includes a first frame member 15 which in the operative position is disposed in fluid-tight engagement with the transom 13 of the boat.

As best seen in FIG. 2, the frame member 15 is of generally U-shaped configuration with the leg portions of the U projecting upwardly above the outer drive housing 11, and the arcuate base portion 21 of the U extending beneath the outer drive housing 11 for purposes to become apparent. In the illustration of FIGS. 1 and 2, the leg portions have been broken away, however they may extend upwardly beyond the transom to any desired height.

A second frame member 16 of generally U-shaped configuration also, has the leg portions of the U joined to the frame member 15 on opposite sides of the outer drive housing 11 to form a continuous horizontally disposed frame projecting rearwardly of the boat 10. Suitable braces 17 and 18 may be provided to reinforce the connection between the frame members 15 and 16.

A flexible plastic envelope 20 having a closed bottom and integral side is suspended from the frame members 15 and 16, which define the mouth or opening of the envelope. For convenience of illustration, portions of the envelope 20 have been broken away in FIG. 1. While the envelope is described as being of plastic, it is obvious that any suitable material may be used. For example, Saran, vinyl, treated fabric or the like may be used as well as more rigid materials so long as they will isolate the water within the envelope from the surrounding water. One method of attaching the flexible envelope to the frame members will be described in detail below in conjunction with FIG. 3. The opening or mouth is held rigid by the lower portion of the U-shaped frame member 15 and the rearwardly projecting frame member 16 in order to enhance the ease of installing the protective device over the outer drive housing 11. This will become more apparent when a full description of the installation procedure is given.

As is seen in FIGS. 1 and 2 the flexible plastic envelope 20 surrounds the outer drive housing 11 extending upwardly along the transom 13 so that in the installed position the frame member 16 is disposed above the water line indicated by the wavy line 41. Suitable means is provided to maintain the frame member 15 in fluidtight engagement with the transom 13 to seal the portion of the envelope mouth which is disposed below the water line 41.

In the enlarged view of FIG. 3, one form of construction which the frame member 15 can assume is illustrated in section. Two interfitted frame members 23 and 24 of rectangular cross section are positioned one within the other. The marginal edge of the mouth of the plastic envelope 20 extends between the frame members 23 and 24, and curls around an elastomeric seal means 26 with the free end of the envelope 20 extending back between the frame members 23 and 24. Rivets 25 (only one shown) or the equivalent clamp the double thickness of the envelope tightly between the frame members 23 and 24 at spaced intervals. If desired, the seal member 26 may extend along the entire length of the frame member 15 to protect the transom from damage. A similar method may be employed to attach the mouth of the flexible envelope to the frame member 16, however the seal 26 may be omitted if desired. Obviously, other methods are equally suitable to attach the envelope to the frame so long as the requisite seal is provided along the frame 15.

As is seen in FIGS. 1 and 2, a cross brace member 27 joins the upper leg portions of the frame 15 above the mouth of the bag, the cross brace member 27 having a flat base 30' integral with diverging leg portions 31 and 32 angularly disposed relative to the frame 15. A locking bracket 28 is attached to the transom 13 by means of suitable screws, or alternatively, may be joined to the outer drive housing, and is provided with a wing nut 29 at its outer threaded end portion 33. The wing nut 29 co-operates with the flat base on the cross brace 27, and as it is advanced, urges the frame 15 against the transom 13 while simultaneously urging the frame member 15 upwardly for reasons to become apparent.

As seen in FIG. 3, the lower arcuate end 21 of the frame member 15 extending beneath the outer drive housing 11 engages a cam member 30 attached to the outer drive housing 11. As the wing nut 29 forces the frame 15 upwardly, the lower end 21 is urged towards the transom 13 compressing the seal 26 therebetween to form a fluidtight joint serving to isolate the water within the flexible envelope from the water without the flexible envelope. Obviously, the cam member 30 may be attached to the transom 13 also in order to permit the present design to be easily applied to existing outer drives.

It is obvious from the foregoing that the marine protective device of the present invention is easily installed. The upward projecting ends of the frame member 15 extend above the transom to provide handles for gripping the protective housing during removal or installation. In the latter case, the entire housing is lowered into the water and the flexible envelope 20 filled. The protective device is then lowered into position and the mouth of the envelope 20 formed by the frame members 15 and 16 pulled up over the outer drive housing 11 and propeller much in a similar manner to pulling on one's shoe. The lower arcuate end 21 of the frame 15 is moved up closely adjacent the transom 13 to engage the cam 30 with the wing nut 29 engaging with the cross brace 27. As the wing nut 29 is advanced, the frame 15 moves towards the transom 13 and upwardly camming the lower arcuate end 21 into tight engagement with the transom 13 and compressing the seal 26 between the transom 13 and frame member 15 to form a fluidtight joint. Thus, the water surrounding the outer drive is isolated from the surrounding medium. Thereafter, suitable chemicals of known type may be added to the water isolated by the flexible envelope 20 to neutralize the corrosive action. Other chemicals of known type may also be added to inhibit the growth of marine life which is commonly referred to as barnacles in the language of the sea. Removal is accomplished in a reverse manner when the water craft is to be used.

From the foregoing it is obvious that numerous departures may be made without departing from the spirit and scope of the invention. Therefore it is intended that any limitations imposed be within the spirit and scope of the appended claims.

I claim:

1. A marine protective device adapted to be positioned over an outer drive of a boat, said outer drive being joined to a transom portion on said boat and projecting rearwardly and downwardly therefrom, said marine protective device comprising an open frame having a transom engaging portion adapted to be mounted adjacent said transom, an impervious envelope fluidtightly joined to said open frame and adapted to isolate said outer drive from the surrounding media when said frame is mounted on said transom, seal means interposed between said frame and said transom, and means cooperating with said frame to urge said frame and said seal means into fluidtight engagement with said transom thereby to isolate the water surrounding said outer drive.

2. For use on a water craft having a marine drive arrangement mounted on a transom portion thereof, a marine equipment protective device adapted to envelope said marine drive during periods of non-use, said protective device comprising a first frame member adapted to be positioned in fluidtight engagement wtih said transom on opposite sides of said drive, a second frame member projecting rearwardly from said first frame member, a flexible impervious envelope joined to said first and second frame members and being adapted to surround said marine drive, and means to hold said first frame member in fluidtight engagement wtih said transom to maintain said flexible envelope disposed around said marine drive thereby to isolate said drive from the surrounding medium.

3. The marine equipment protective device of claim 2 wherein said means to hold said first frame member against said transom includes cam means cooperating with a lower portion of said first frame member, and an adjustable locking means urging said first frame member upwardly and inwardly towards said transom whereby said first frame member will be maintained fluidtightly in engagement wtih said transom.

4. For use on a water craft having an outer drive thereon, said outer drive being mounted on a transom portion of said water craft, the provision of a marine equipment protective device adapted to isolate the water immediately adjacent said outer drive from the remainder of the water during periods of non-use in order to permit effective treatment of the isolated water, said marine equipment protective device comprising an impervious flexible envelope, a frame member supporting said flexible envelope around the upper marginal edges thereof to form a substantially rigid mouth portion permitting placement of said envelope and frame member around said outer drive, means for attaching said frame to said water craft and seal means interposed between said frame member and said water craft to isolate an inner portion of said mouth portion and flexible envelope from an outer portion whereby the water in said envelope may be treated to protect said outer drive.

5. The marine equipment protective device of claim 4 wherein said means for attaching said frame to said water craft includes cam means engaging a lower portion of said frame member to urge it into engagement with said water craft, and locking means urging said frame member towards said water craft and upwardly to maintain said lower portion of said frame in engagement wtih said cam means.

No references cited.

MILTON BUCHLER, *Primary Examiner.*

ANDREW H. FARRELL, *Examiner.*